(12) United States Patent
Caron

(10) Patent No.: US 11,260,978 B2
(45) Date of Patent: Mar. 1, 2022

(54) VALVE FOR AIRCRAFT ENVIRONMENTAL CONTROL SYSTEM CONDUIT

(71) Applicant: PRATT & WHITNEY CANADA CORP., Longueuil (CA)

(72) Inventor: Jean-Francois Caron, Drummondville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 270 days.

(21) Appl. No.: 16/402,925

(22) Filed: May 3, 2019

(65) Prior Publication Data

US 2020/0346761 A1 Nov. 5, 2020

(51) Int. Cl.
| | |
|---|---|
| *B64D 13/06* | (2006.01) |
| *F02C 6/08* | (2006.01) |
| *F15B 15/14* | (2006.01) |
| *F16K 3/06* | (2006.01) |
| *F02K 3/06* | (2006.01) |

(52) U.S. Cl.
CPC .............. *B64D 13/06* (2013.01); *F02C 6/08* (2013.01); *F02K 3/06* (2013.01); *F15B 15/14* (2013.01); *F15B 15/1476* (2013.01); *F16K 3/06* (2013.01); *B64D 2013/0603* (2013.01); *F05D 2260/50* (2013.01)

(58) Field of Classification Search
CPC ........ B64D 13/02; B64D 13/04; B64D 13/06; B64D 2013/0603; F02C 6/08; F02C 9/18; F15B 15/1476; F15B 15/025; F16K 3/03; F16K 3/06; F16K 1/12–122; F16K 1/20; F16K 1/2021; F01D 17/14; F01D 17/141; F01D 17/145

USPC ................................. 251/212; 138/40, 45, 46
See application file for complete search history.

(56) References Cited

U.S. PATENT DOCUMENTS

| | | | | |
|---|---|---|---|---|
| 1,841,608 | A * | 1/1932 | Kruse ..................... | F16K 17/32 137/220 |
| 2,321,336 | A * | 6/1943 | Tondreau ................. | F16K 3/03 251/212 |
| 2,649,272 | A * | 8/1953 | Barbato ................... | F16K 3/03 251/212 |
| 3,362,424 | A * | 1/1968 | Smith ...................... | F16K 1/12 137/220 |
| 3,537,644 | A * | 11/1970 | Davison ................. | B64D 13/04 236/80 R |
| 3,792,716 | A * | 2/1974 | Sime ....................... | F16K 1/126 137/492 |
| 4,026,321 | A * | 5/1977 | Kahoe .................... | G05D 23/19 137/487 |
| 4,098,085 | A | 7/1978 | McDowell | |
| 4,773,307 | A * | 9/1988 | Goodman .............. | B64D 13/04 454/73 |
| 6,058,725 | A * | 5/2000 | Monfraix ............... | B64D 13/02 165/235 |
| 8,047,226 | B2 * | 11/2011 | Kesner .................... | F16K 17/06 137/489 |
| 8,904,784 | B2 | 12/2014 | Pesiridis et al. | |

(Continued)

*Primary Examiner* — Alain Chau
(74) *Attorney, Agent, or Firm* — Norton Rose Fulbright Canada LLP

(57) ABSTRACT

A compressed air conduit can have a cross-sectional area, and a valve, the valve having at least one arm being deployable laterally into the cross-sectional area of the conduit to restrict flow within the conduit.

19 Claims, 5 Drawing Sheets

(56) References Cited

U.S. PATENT DOCUMENTS

| | | | | |
|---|---|---|---|---|
| 8,978,351 | B2* | 3/2015 | Suciu | B64D 13/06 |
| | | | | 60/39.08 |
| 9,110,475 | B2* | 8/2015 | Simpson | F16K 31/1225 |
| 9,388,707 | B2 | 7/2016 | Martinez-Botas et al. | |
| 9,964,223 | B2* | 5/2018 | Coretto | F16K 17/20 |
| 10,190,539 | B2 | 1/2019 | Bowcutt et al. | |
| 10,465,706 | B2* | 11/2019 | Lombard | F04D 27/0253 |
| 10,508,743 | B2* | 12/2019 | Wakayama | F16K 37/0041 |
| 10,626,801 | B2* | 4/2020 | Mackin | F02C 6/08 |
| 2009/0095350 | A1* | 4/2009 | Bauman | F16K 21/02 |
| | | | | 137/1 |
| 2009/0314364 | A1* | 12/2009 | Kesner | F01D 17/145 |
| | | | | 137/629 |
| 2013/0097992 | A1* | 4/2013 | Suciu | F02C 7/14 |
| | | | | 60/39.83 |
| 2014/0124061 | A1* | 5/2014 | Daniels | F16K 3/03 |
| | | | | 137/505 |
| 2014/0366965 | A1* | 12/2014 | Simpson | G05D 16/10 |
| | | | | 137/500 |
| 2017/0016549 | A1* | 1/2017 | Coretto | F02C 6/08 |
| 2017/0211707 | A1* | 7/2017 | Wakayama | F16K 3/03 |
| 2017/0218853 | A1* | 8/2017 | Mackin | F04D 27/0215 |
| 2017/0292616 | A1* | 10/2017 | Moens | F16K 3/03 |
| 2017/0298953 | A1* | 10/2017 | Lombard | F04D 29/4213 |

\* cited by examiner

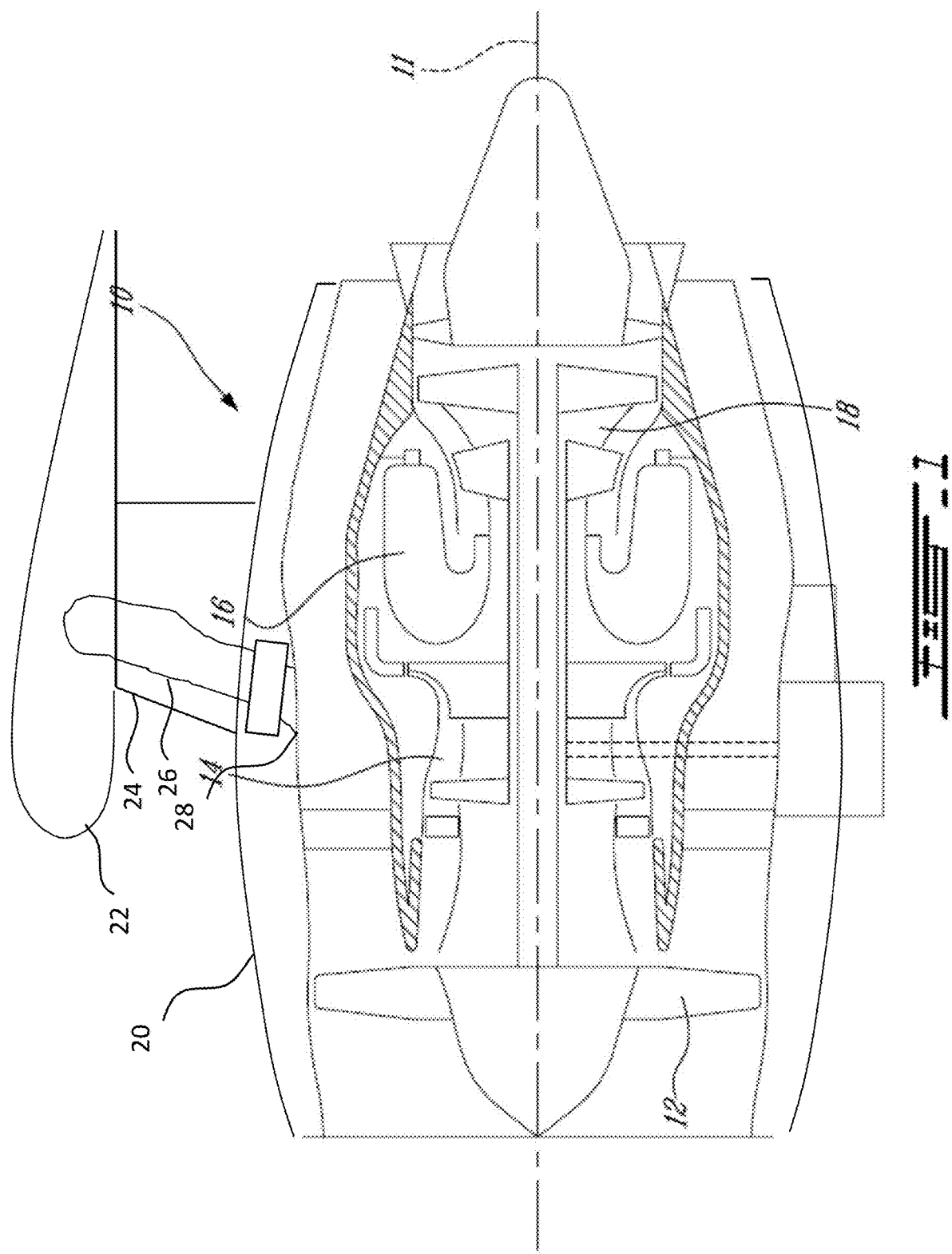

VALVE FOR AIRCRAFT ENVIRONMENTAL CONTROL SYSTEM CONDUIT

TECHNICAL FIELD

The application related generally to aircrafts and, more particularly, to a valve for an environmental control system of an aircraft.

BACKGROUND OF THE ART

Aircrafts have environmental control systems which typically perform, amongst others, the function of maintaining air pressure in the cabin for the comfort of the passengers. The compressed air can be provided by the engine and an environmental control system conduit can extend between the engine and the passenger cabin to convey the pressurized air. The environmental control system conduit can include flexible portions connected to rigid portions, to accommodate for thermal growth near the engine. If the environmental control system conduit leaks, a large volume of air can be discharged in the vicinity. In the context where the breach occurs inside a nacelle or pylon, for instance, such a large volume of air discharge can be undesired. There thus remains room for improvement.

SUMMARY

In one aspect, there is provided an environmental control system for an aircraft, the environmental control system having a conduit having a cross-sectional area, and a valve, the valve having at least one arm being deployable laterally into the cross-sectional area of the conduit to restrict flow within the conduit.

In another aspect, there is provided a method of operating an aircraft environmental control system having a conduit, the method comprising: contingent upon receiving an indication of a pressure reduction at a sensing point along the conduit, deploying an arm into the cross-sectional area of the conduit, upstream of the sensing point, the deployed arm restricting flow along the conduit towards the sensing point.

In a further aspect, there is provided a gas turbine engine comprising compressed air conduit extending from a compressed air bleed point, the compressed air conduit having a cross-sectional area, and a valve, the valve having at least one arm being deployable laterally into the cross-sectional area of the conduit to restrict flow within the conduit.

DESCRIPTION OF THE DRAWINGS

Reference is now made to the accompanying figures in which:

FIG. 1 is a schematic cross-sectional view of a gas turbine engine;

DETAILED DESCRIPTION

Figure 2A:
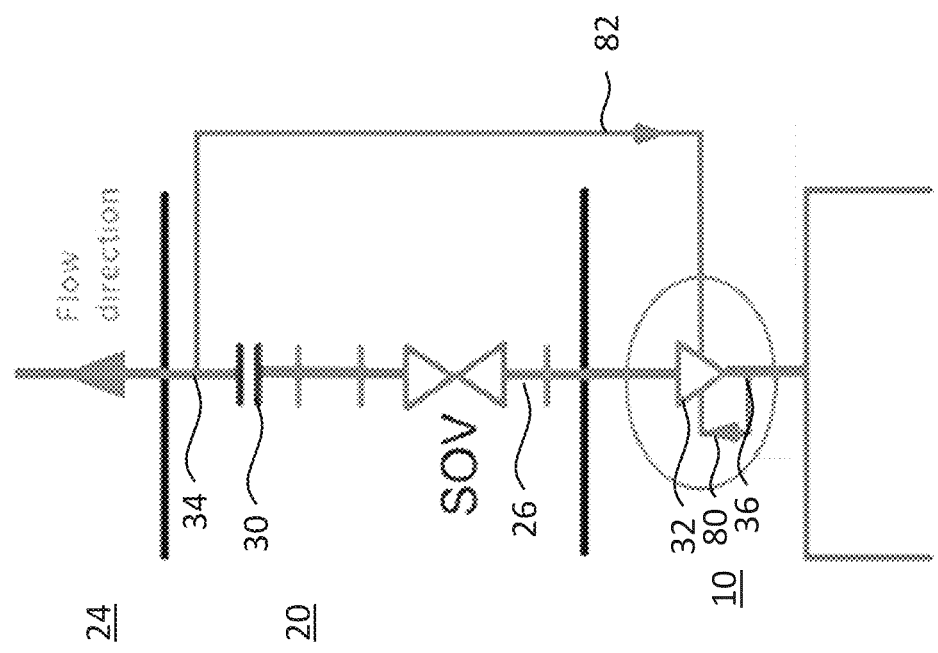
FIG. 2A is a diagram of an environmental control system having a valve, in accordance with an embodiment.

FIG. 1 illustrated a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The gas turbine engine has a nacelle 20, and is suspended to an aircraft wing 22 (or fuselage) via a pylon 24. An environmental control system conduit 26 has an inlet 28 in the gas turbine engine 10 to source pressurized air and convey it to the environmental control system. The pressurized air can be used to control cabin pressure, de-ice the nacelle front lip and wings, and start the other engines, for instance.

The environmental control system conduit 26 is schematically depicted in FIG. 2A. If the environmental control system conduit 26 fails, air at high pressure and temperature can escape through the breach, which can lead to the discharge of a relatively large volume of air, and in turn, a raise in the pressure and temperature in the vicinity of the breach. Some parts of the aircraft may be damaged should such a rise in pressure occur, this may be the case if the breach occurs in the nacelle 20 (e.g. in volume contained between bypass duct and nacelle outer skin) or pylon 24, for instance. Such a breach 30 can result from the failure of a V-clamp joining a rigid section to a flexible section of the conduit, for instance.

Figure 2B:
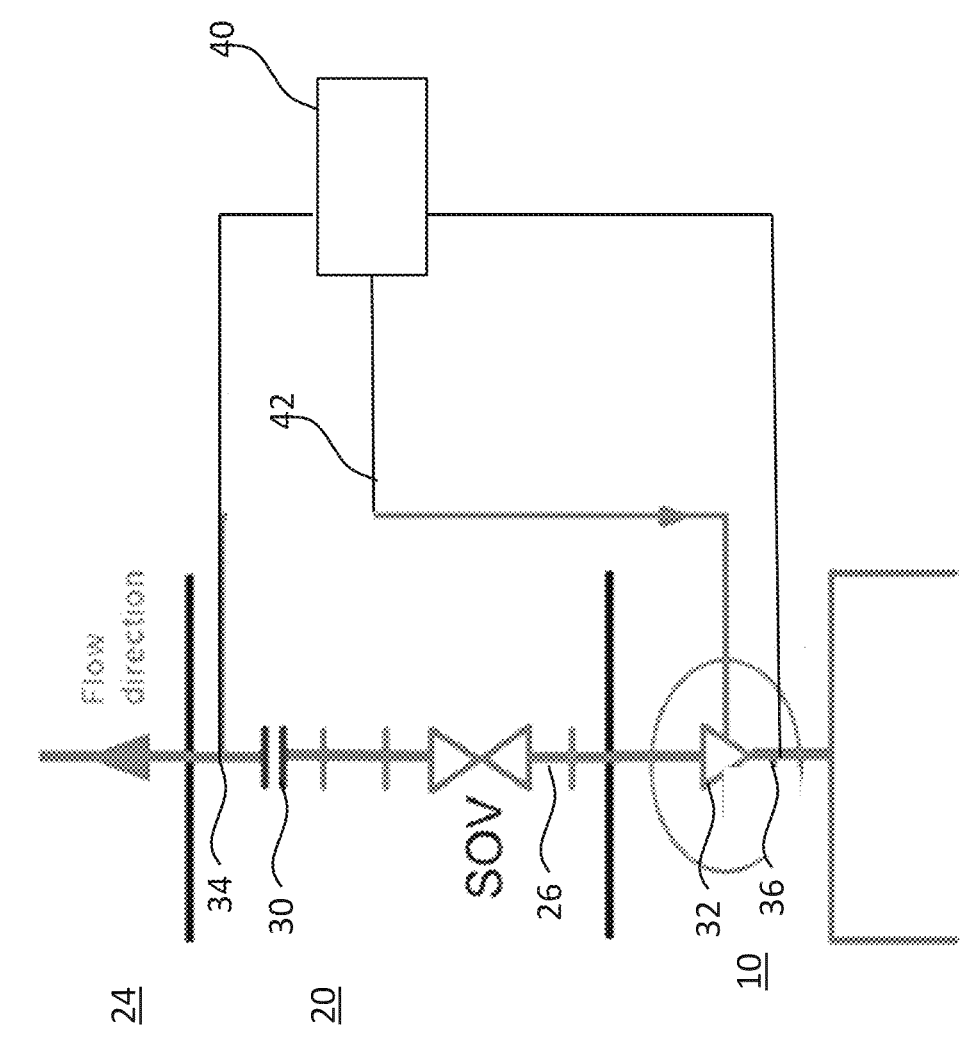
FIG. 2B is a diagram of an environmental control system having a valve, in accordance with another embodiment.

In one embodiment, a valve 32, which can be referred to herein as a flow restriction valve, can be used upstream of the breach 30 to limit the volume of gas discharged through the breach 30 and thereby limit the increase of pressure in the vicinity of the breach 30. In this example, the valve 32 is triggered mechanically by the action of a pressure differential. More specifically, upon a breach 30 in the conduit 26, the pressure will lower downstream of the breach. Abrupt pressure changes in the system will travel at the speed of sound. In this embodiment, it was found that one way to quickly activate a flow restriction valve upon such a breach was to configure the valve 32 in a manner to be mechanically activated directly by this change in pressure. More specifically, a piston slidingly mounted in a cylinder can separate two pressure environments. The pressure environments can be portions of the cylinder cavity separated from one another by the piston's head. One of these pressure environments can be fluidly connected to a point 34 in the conduit 26 downstream of the breach 30 (or more exactly, potential breach 30), and the other one of these pressure environments can be fluidly connected to a point 36 where the pressure remains high, such as immediately upstream of the valve 32, for instance. Pressure directly travels at the speed of sound, which can lead to a very rapid activation of the valve 32 upon occurrence of a breach 30. In alternate embodiments, such as the one shown in FIG. 2B, using a motorized valve (e.g. powered by an electric or hydraulic motor) which is activated on the basis of an electromagnetic signal 42 emitted by a computer or controller 40 on the basis of signals received from pressure sensors positioned at one or more pressure points 34, 32 can be considered satisfactory as well, even though this may lead to a slower activation speed than a direct pneumatic design. In many embodiments, motorized valves based on electromagnetic signal control can be used very similarly to how direct pneumatic valves would be used, simply by changing the pressure line inputs by pressure sensors feeding signals to the controlling device, or vice-versa.

Figure 3B:
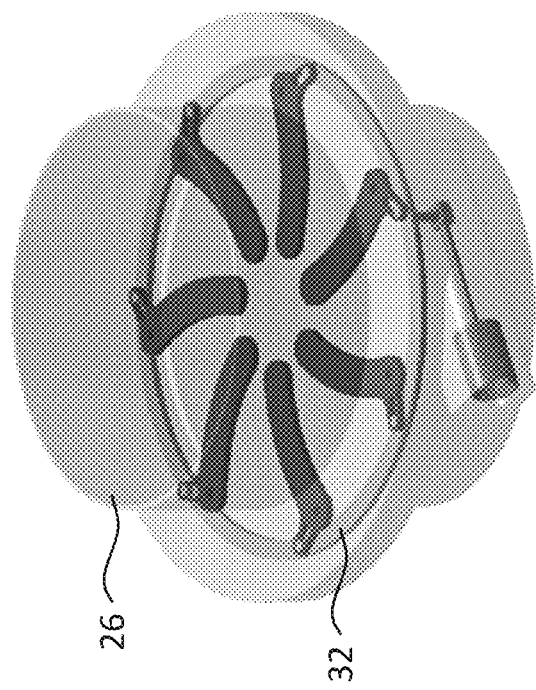
FIGS. 3A and 3B are oblique views showing the valve in the retracted and in the deployed configurations, respectively.
Figure 3A:
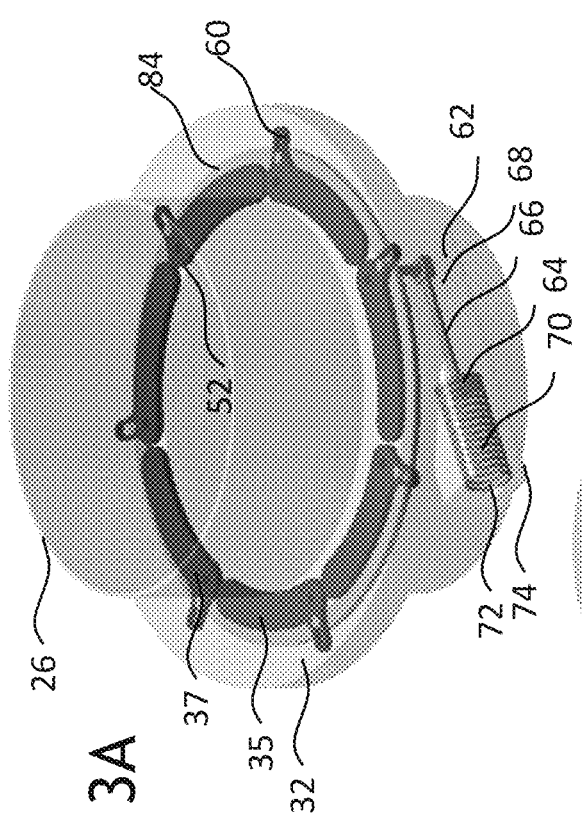
Figure 3C:
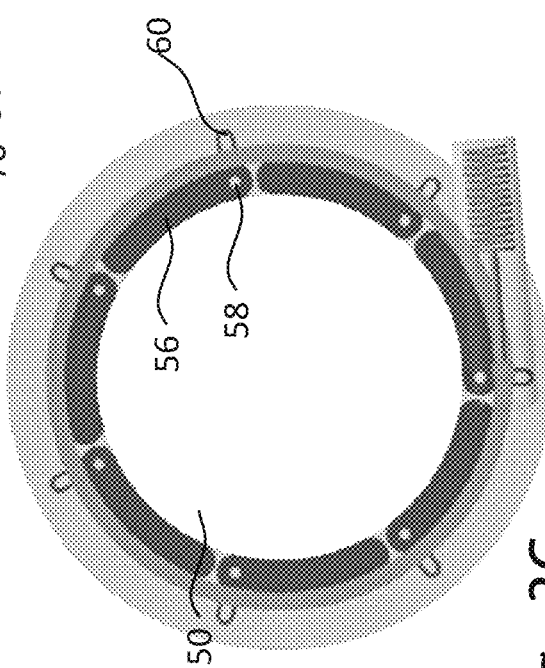
FIG. 3C is a transversal cross-section view thereof in the retracted configuration.

An example of a valve 32 which can be used to cause the flow restriction is shown in FIGS. 3A and 3B. The valve 32 is made integral to an environmental control system (ECS) conduit 26. In this example, the ECS conduit 26 has a circular cross-section 50, and the valve 32 has a plurality of arms 35, 37 which are circumferentially interspaced from one another and disposed radially externally around the circular cross-section 50 of the ECS conduit 26, but it will be understood that in alternate embodiments the valve 32 can have a single arm if this is found suitable in the circumstances. The arms 35, 37 are configured in a manner to be deployed laterally to obstruct a previously unobstructed portion of the circular cross-section 50, and thereby cause a flow restriction. In this embodiment, each arm is deployed by a pivoting movement, but it will be understood that a linear sliding movement can be used instead in alternate embodiments.

In this example, during non-activating operating conditions, the arms 35, 37 are retracted into an annular slot 52 which surrounds the circular cross-section 50 of the conduit 26. The arms 35, 37 can be flat and planar, with a thickness oriented parallel to an axis of the cross-section, or direction of the pressurized gas conveyed by the conduit. The slot can be correspondingly narrow to snugly receive the thickness of the arms, in a manner to minimize pressure losses when the arms 35, 37 are retracted. More specifically, the thickness and radial width of the arms 35, 37 can be configured to conform in shape with the corresponding portion of the edges of the slot. Similarly, the circumferential spacing between adjacent arms 35, 37 can be minimized in an effort to limit pressure losses when retracted. In this example, the annular slot 52 has a constant radial depth around the cross-sectional flow area 50 of the conduit 26, and the arms 35, 37 were generally provided with an obstructing portion having a bidimensional shape configured to adapt to the shape of the slot 52 and the aforementioned requirements. A curved obround shape with two semi-circular ends connected by a curved rectangular portion adapted to match the external shape of the circumference of the cross-sectional area was elected in this specific embodiment, giving the obstructing portion 56 of the arms 35, 37 a shape resembling that of a cucumber or pickle. The obstructing portion 56 of the arms 35, 37 can be said to generally extend from the pivot axis 58 of the arm in a first direction, and the arms 35, 37 also have an actuating portion 60 which projects from the pivot 58 in a second direction. In this embodiment, the actuating portion 60 is the portion which is mechanically acted upon to pivot the arm 35, 37 around its pivot 58, and thereby either deploy it to obstruct a portion of the ECS conduit's cross-section 50, or retract it to nest it into the slot 52 to remove the obstruction. To favor quick activation, it can be preferred to limit the weight of the arms and avoid friction to the extent reasonable. In some embodiments, it can be preferred to use a ball bearing to provide a low friction pivot. In some embodiments, there can be a tradeoff made between the amount of play allowed between moving and stationary components, which can contribute to lower friction to a certain extent, and the desire to limit the aerodynamic obstacle to the flow that such play causes to limit pressure losses.

In this embodiment, an actuator 62 is provided in the form of a piston 64 slidingly mounted in a cylinder 74. The cavity of the cylinder 74, on a first side of the piston head 64, forms a first pressure environment 70 is connected to a first pressurized air inlet 36 located in or near the valve 32 via a first fluid conduit 80, and the second pressure environment 68 on the second side of the piston head 64 is connected to a second pressurized air inlet 34 provided near or downstream of a potential breach point via a second fluid conduit 82. In this case, the first fluid conduit 80 is provided in the form of a cylindrical aperture extending between the cylinder cavity 70 and the internal surface of the ECS conduit 26, such as a bore defined in the valve housing, and the second fluid conduit 82 is provided in the form of a hose connecting the cavity of the cylinder on the second side of the piston head 64 to a point 34 of the ECS conduit positioned downstream of a potential breach 30. Accordingly, in the event of a breach of the ECS conduit 26, the pressure near the valve 32 can become substantially higher than the pressure at the second point of the ECS conduit, leading to a pressure differential on opposite sides of the piston head 64, which will force the piston head 64 to slide toward the side of lower pressure.

The actuator 62 can have an actuator member mechanically connected to an actuating portion 60 of the arm 35. In this embodiment, the actuator member has a shaft 66 which is mechanically connected to the actuating portion 60 of the arm via a ring 84. More specifically, a ring 84 is rotatably received in an annular cavity and mechanically connects the actuating portions 60 of all arms 35, 37 via a pivot connection, and the shaft 66 is connected to the ring 84 via another pivot connection. Accordingly, when the shaft 66 moves longitudinally, it drives the ring 84 into rotation, which simultaneously pivots all the arms 35, 37 around their corresponding pivots. Opposite movements of the shaft 66 generate correspondingly opposite movements of the arms 35, 37, to selectively deploy or retract.

In this embodiment, a biasing member 72 is provided to bias the piston head 64 to a default position. The default position can correspond to a deployed configuration or a retracted configuration of the arm(s), depending on the embodiment. In this embodiment, the biasing member 72 is a spring which biases the arms 35, 37 to the retracted position. The spring force is selected in a manner to be weaker than the force corresponding to a pressure differential which is likely to arise in the event of a breach. Accordingly, in the event of a breach, the pressure differential can quickly overcome the biasing force of the spring and move the piston head 64, and in turn the arms 35, 37, to the deployed position.

Figure 4:
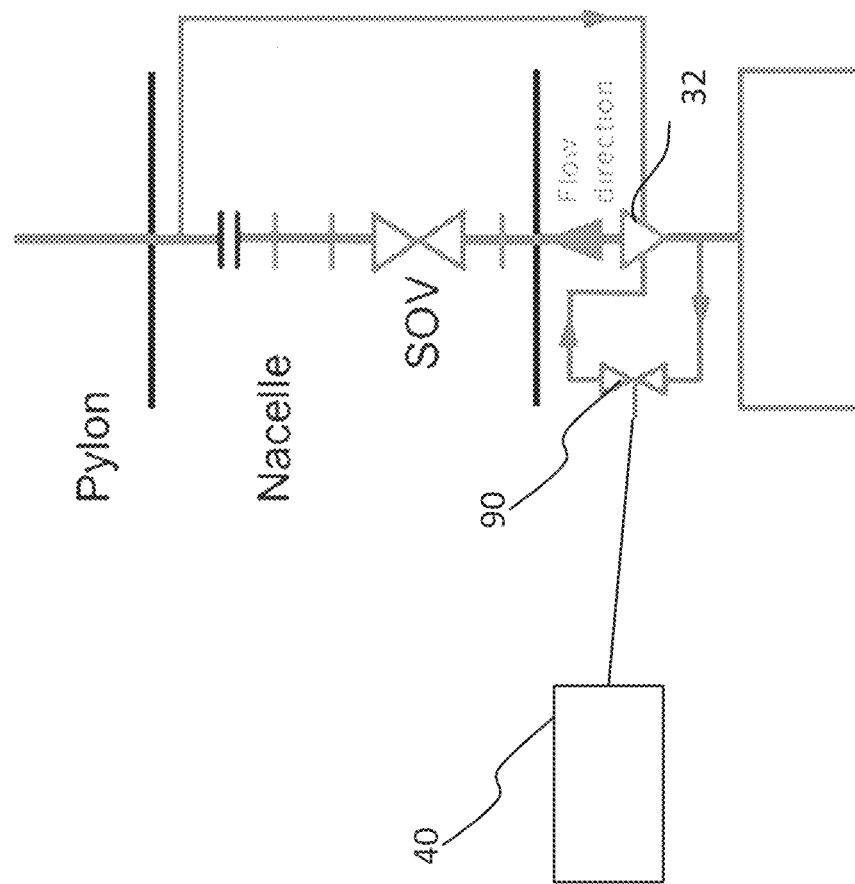
FIG. 4 is a diagram of an environmental control system having a valve, in accordance with another embodiment.

Various alternate configurations of use are possible in alternate embodiments, and accordingly, various configurations of actuation systems for the flow restriction valve are possible. FIG. 4 shows one possible example. In the embodiment shown in FIG. 4, an electronically controlled valve 90 is used to selectively "arm" or "disarm" the flow restriction valve 32. Indeed, if the valve 32 is biased to the retracted configuration, it can be preferred to configure the valve actuation system in a manner for the valve to become operable only when a certain set of conditions, associated to a potential ECS conduit breach, is sensed. Indeed, a computer or controller 40 can be provided which receives sensed inputs of various parameters and which can have software allowing it to determine that the set of conditions is met, or not met. The control device 40 can determine that takeoff conditions are undergoing for instance. When the control device 40 determines that the set of conditions is met, it can send an electromagnetic signal, wiredly or wirelessly, to control a shutoff valve 90 provided in the first fluid conduit to open the first fluid conduit and allow the fluid pressure in the first fluid conduit to reach the flow restriction valve 32. Only when the shutoff valve 90 is open, will a pressure differential cause the flow restriction valve 32 to deploy. Indeed, in such an example, for instance, the actuation of the valve 32 would only take place when the shutoff valve 90 is positioned in the open configuration by that control device 40, because otherwise, the fluid pressure in the corresponding portion of the cylinder cavity will not be sufficient to overcome the bias of the biasing member 72. Such an activation scheme can be advantageous when a) periods of potential ECS conduit breach are relatively limited relative to the entire operating envelope of the gas turbine engine, b) other conditions of the operating envelope than one of potential ECS conduit breach are likely to trigger the activation of the flow restriction valve (e.g. operation of a shutoff valve (SOV) in the ECS conduit itself), and c) it is desired to limit wear on the flow restriction valve to reduce the associated maintenance burden, for example.

Similarly, in alternate embodiments, valves can be used in the first pressure line, in the second pressure line, or both, to open or close such lines when certain corresponding condition sets are met, or even switch the corresponding pressure line connection between different points where potentially different pressures may be sensed.

In the example embodiment shown in FIGS. 3A and 3B, the arms are configured to collectively obstruct, when deployed, a portion of the cross-sectional ECS conduit area corresponding to roughly 45% of the total cross-sectional ECS conduit area available when the arms are retracted. This can produce a reduction of flow rate in the order of 30-40%, and can be considered a sufficient amount of flow obstruction to avoid consequences which could otherwise be associated with a ECS conduit breach in some embodiments. More or less flow obstruction can be achieved by increasing the width of the arms, or changing the shape of the arms, for instance. Alternately, a greater amount of flow obstruction can be achieved by using a sequence of two, or more, flow restriction valves adjacent to one another in the ECS conduit, in which case the subsequent flow restriction valves can be angularly offset from one another for the arms of a first restriction valve to be aligned with spacings between the arms of a second restriction valve when deployed, for instance. Most applications will require a degree of reduction of flow rate of 5% or more by deploying the arms, which can be achieved by using arms which occupy between 5 and 10% of the cross-sectional ECS conduit area when deployed, for instance. In many applications, the degree of reduction of flow rate will be of above 10%, and even above 25%. Accordingly, in many applications, the arms will be configured to occupy more than 15%, even more than 30%, of the ECS conduit area when deployed. Some embodiments can require an obstruction closer to 100%.

It is desired to minimize the pressure loss caused by the valve when the arms are retracted. It was found relatively easy to design the valve in a manner that the pressure losses caused by the valve when the arms are retracted was of less than 1%, and even less than a fraction of 1%.

The ECS conduit can be manufactured and sold as part of a gas turbine engine. Alternately, the ECS conduit can be provided as an integral part of an aircraft. If the gas turbine engine is a turbofan engine, the ECS conduit inlet can be connected to the bypass duct. Alternately, the ECS conduit inlet can be connected to another source of compressed air, such as to a main gas path, between compressor stages, or between a compressor and the combustion chamber.

When deployed, the pressure developed on the arms acts in a plane normal to the direction of the movement of the arms. This can be advantageous as the effect of flow disruption on the deployment action can be limited.

In the embodiment presented above, the arms can also move into the obstructing position if the low pressure sensing line fails. To avoid this, an electrical sensor may be integrated to the actuation mechanism in order to interpret the position of the arms with regards to the state of the system. Accordingly, any failure of the valve can be detected and corrective action can be taken by the pilots.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An environmental control system for an aircraft, the environmental control system having a conduit having a cross-sectional area and a valve, the valve having at least one arm being deployable laterally from a retracted position offset from the cross-sectional area to a fully deployed position into the cross-sectional area of the conduit, the at least one arm configured to occupy at least 5% of the cross-sectional area of the conduit and to restrict flow within the conduit when fully deployed, at least a portion of the cross-sectional area being free of the at least one arm when fully deployed.

2. The environmental control system of claim 1 wherein the valve has a plurality of arms circumferentially interspaced from one another around a circumference of the cross-sectional area, each arm being pivotally deployable into the cross-sectional area of the conduit.

3. The environmental control system of claim 2 further comprising an annular slot surrounding the cross-sectional area of the conduit, the arms being pivotally retractable into the annular slot.

4. The environmental control system of claim 3 wherein each arm has a planar body with an obstructing portion projecting from a pivot in a first direction, and an actuating portion projecting from the pivot in a second direction, the obstructing portion snugly conforming in shape to a portion of the slot.

5. The environmental control system of claim 4 further comprising an actuating ring mechanically interconnecting the actuating portion of all the arms.

6. The environmental control system of claim 1 wherein each arm has a planar body with an obstructing portion projecting from a pivot in a first direction, and an actuating portion projecting from the pivot in a second direction.

7. The environmental control system of claim 1 further comprising an actuator configured to selectively deploy or retract the arm.

8. The environmental control system of claim 7 wherein the actuator has a piston configured to be moved within a cylinder based on a pressure differential between two piston sides in the cylinder, a first fluid conduit connecting the first piston side to a first inlet upstream of the valve, and a second fluid conduit connecting the second piston side to a second inlet downstream of the valve.

9. The environmental control system of claim 8 further comprising a biasing member biasing the piston to a default position.

10. The environmental control system of claim 8 further comprising a shutoff valve in the first fluid conduit, the shutoff valve being configured to selectively open or close the first fluid conduit based on an electromagnetic signal input.

11. A method of operating an aircraft environmental control system having a conduit, the method comprising:
contingent upon receiving an indication of a pressure reduction at a sensing point along the conduit, deploying an arm into a cross-sectional area of the conduit, upstream of the sensing point, the deployed arm reducing the flow rate along the conduit towards the sensing point by at least 5%.

12. The method of claim 11 wherein deploying includes pivoting a portion of the arm into the cross-sectional area of the conduit.

13. The method of claim 12 wherein deploying includes collectively pivoting a plurality of circumferentially interspaced arms into the cross-sectional area of the conduit.

14. The method of claim 11 wherein deploying includes a differential of pressure causing a deploying force to be exerted onto the arm.

15. The method of claim 14 wherein the differential of pressure is a differential of pressure between two points interspaced along the conduit, including the sensing point, and the differential of pressure is conveyed via fluid lines.

16. The method of claim 15 wherein the differential of pressure causes a sliding of a piston inside a cylinder, the piston being mechanically connected to deploy the arm.

17. A gas turbine engine comprising a compressed air conduit extending from a compressed air bleed point, the compressed air conduit having a cross-sectional area, and a valve, the valve having at least one arm being deployable laterally from a retracted position offset from the cross-sectional area to a fully deployed position into the cross-sectional area of the conduit to restrict flow within the conduit, at least a portion of the cross-sectional area being free of the at least one arm when fully deployed.

18. The gas turbine engine of claim 17 wherein the gas turbine engine is a turbofan engine and includes a fan, a core engine, and a bypass path, wherein the compressed air bleed point is in the bypass path.

19. The gas turbine engine of claim 17 wherein the operation of the valve is powered mechanically by a differential of pressure.

* * * * *